United States Patent
Nitta

(10) Patent No.: US 11,116,192 B2
(45) Date of Patent: Sep. 14, 2021

(54) LIVE BAIT ZIP TIE

(71) Applicant: Gye S. Nitta, Honolulu, HI (US)

(72) Inventor: Gye S. Nitta, Honolulu, HI (US)

(*) Notice: Subject to any disclaimer, the term of this patent is extended or adjusted under 35 U.S.C. 154(b) by 212 days.

(21) Appl. No.: 16/363,953

(22) Filed: Mar. 25, 2019

(65) Prior Publication Data
US 2019/0216066 A1 Jul. 18, 2019

Related U.S. Application Data

(63) Continuation-in-part of application No. 29/621,141, filed on Oct. 4, 2017, now Pat. No. Des. 844,417.

(51) Int. Cl.
A01K 83/06 (2006.01)

(52) U.S. Cl.
CPC .................. A01K 83/06 (2013.01)

(58) Field of Classification Search
CPC ........ A01K 83/06; A01K 95/02; A01K 91/04; A01K 91/047; F16L 3/137; F16L 3/233; F16L 3/24; F16L 3/243; F16L 3/2431; F16L 3/245
USPC .......................... 248/62, 65, 68.1, 74.1, 74.3
See application file for complete search history.

(56) References Cited

U.S. PATENT DOCUMENTS

| | | | | |
|---|---|---|---|---|
| 863,272 | A * | 8/1907 | Gebhardt | A01K 83/06 43/44.8 |
| 2,583,680 | A * | 1/1952 | Brennan | A01K 83/06 43/43.1 |
| 3,022,557 | A * | 2/1962 | Logan | F16L 3/233 24/17 R |
| 3,072,986 | A * | 1/1963 | Lefnaer | B65D 63/18 24/16 PB |
| 3,105,319 | A * | 10/1963 | Whalen | A01K 83/06 43/44.4 |
| 3,130,462 | A * | 4/1964 | Mitchell | A47G 25/901 24/16 PB |
| 3,200,532 | A * | 8/1965 | Walton | A01K 83/06 43/44.6 |
| 3,318,354 | A * | 5/1967 | Borisof | A45C 11/323 206/38.1 |
| 3,365,753 | A * | 1/1968 | Prenner | B65D 63/1027 24/16 PB |
| 3,568,262 | A * | 3/1971 | Woldman | B65D 63/1063 24/16 PB |
| 3,581,349 | A * | 6/1971 | Verspieren | F16L 3/12 24/16 PB |
| 3,588,963 | A * | 6/1971 | Moberg | G09F 3/14 24/16 PB |

(Continued)

Primary Examiner — Magdalena Topolski
Assistant Examiner — Shada Mohamed Alghailani

(57) ABSTRACT

A live bait zip tie is an apparatus used to bridle-rig a hook to a bait fish. The apparatus is configured to hold the hook in position, so that the hook cannot rotate or swivel. The apparatus includes a prong, a ratchet band, a hook-bracing fixture, a band-receiving head, and a pawl. The prong allows the user to puncture through a bait fish. The ratchet band engages with the pawl to tighten the apparatus against a bait fish. The hook-bracing fixture allows a hook to secure against the body of a bait fish. The band-receiving head allows for connection of the prong and ratchet band. The pawl is a unidirectionally biased protrusion that allows for tightening engagement with the ratchet band. This configuration allows the apparatus to bridle-rig a hook to a bait fish so that the hook does not move during fishing activity.

15 Claims, 6 Drawing Sheets

(56) References Cited

U.S. PATENT DOCUMENTS

| | | | | |
|---|---|---|---|---|
| 3,597,803 | A * | 8/1971 | Van Neil | B65D 63/1027 24/16 PB |
| 3,887,965 | A * | 6/1975 | Schuplin | B65D 63/1063 24/16 PB |
| 3,983,603 | A * | 10/1976 | Joyce | B65D 63/1063 24/16 PB |
| 4,010,568 | A * | 3/1977 | Mays | A01K 83/06 43/42.22 |
| 4,235,404 | A * | 11/1980 | Kraus | F16L 3/233 24/16 PB |
| 4,272,870 | A * | 6/1981 | McCormick | B65D 63/1072 24/16 PB |
| 4,287,644 | A * | 9/1981 | Durand | F16L 3/2334 24/16 PB |
| 4,477,950 | A * | 10/1984 | Cisek | B65D 63/1027 24/130 |
| 4,866,816 | A * | 9/1989 | Caveney | F16L 3/233 24/16 PB |
| 4,910,831 | A * | 3/1990 | Bingold | B65D 63/1036 128/878 |
| 5,117,575 | A * | 6/1992 | Desmond | A01K 83/06 24/16 PB |
| 5,189,826 | A * | 3/1993 | Schlaegel | A01K 83/06 43/42.29 |
| 5,402,971 | A * | 4/1995 | Bower | F16L 3/233 24/16 PB |
| 5,617,668 | A * | 4/1997 | Shimandle | A01K 83/06 43/44.2 |
| 5,855,089 | A * | 1/1999 | Hockmeyer | A01K 83/06 43/42.33 |
| 5,911,368 | A * | 6/1999 | Davignon | B65D 63/1081 24/16 PB |
| 5,956,813 | A * | 9/1999 | Cooper | B65D 63/1063 24/16 PB |
| 6,347,435 | B1 * | 2/2002 | Davignon | B65D 63/1063 24/16 PB |
| 6,665,978 | B1 * | 12/2003 | Reed | A01K 83/06 43/44.4 |
| 6,976,719 | B2 * | 12/2005 | Agayof | A45C 13/30 294/150 |
| 7,202,788 | B2 * | 4/2007 | Shieh | B65D 63/1081 340/572.1 |
| 7,740,210 | B2 * | 6/2010 | Pilon | B65D 63/1081 248/74.3 |
| D619,887 | S * | 7/2010 | Colton | D8/396 |
| 8,387,215 | B2 * | 3/2013 | Koncelik, Jr. | B65D 63/1018 24/16 PB |
| 8,726,468 | B2 * | 5/2014 | Dyer | B65D 63/10 24/16 PB |
| D769,704 | S | 10/2016 | Nitta | |
| 9,485,973 | B2 * | 11/2016 | Burke | A01K 83/06 |
| D792,196 | S | 7/2017 | Nitta | |
| 9,939,086 | B1 * | 4/2018 | Mangone, Jr. | F16L 3/2336 |
| D818,802 | S * | 5/2018 | Iwahara | A01K 91/04 D8/356 |
| D840,788 | S * | 2/2019 | Geiger | D8/356 |
| 10,435,214 | B2 * | 10/2019 | Kuperus | B65D 63/10 |
| 10,513,380 | B2 * | 12/2019 | Watson | B65D 63/1027 |
| 2005/0268525 | A1 * | 12/2005 | Kalazich | A01K 83/06 43/41 |
| 2006/0192059 | A1 * | 8/2006 | Morello | F16L 3/16 248/74.3 |
| 2007/0194181 | A1 * | 8/2007 | Rosemann | F16L 3/2332 248/74.3 |
| 2012/0174350 | A1 * | 7/2012 | Delle Donne | A01K 93/02 24/457 |
| 2012/0277682 | A1 * | 11/2012 | Corato | A61M 25/02 604/179 |
| 2014/0259620 | A1 * | 9/2014 | Hicks | F16L 3/223 29/525.01 |
| 2016/0091122 | A1 * | 3/2016 | Geiger | F16L 3/137 248/61 |
| 2020/0120913 | A1 * | 4/2020 | Rost | A01K 91/12 |
| 2020/0370680 | A1 * | 11/2020 | Hui | H02G 3/32 |

* cited by examiner

LIVE BAIT ZIP TIE

The current application is a continuation-in-part (CIP) application of the U.S. design application Ser. No. 29/621,141 filed on Oct. 4, 2017.

FIELD OF THE INVENTION

The present invention generally relates to a bait arrangement tool. More specifically, the present invention relates to a live bait zip tie which allows for improved arrangement of a hook relative to bait during bridle-rigging.

BACKGROUND OF THE INVENTION

The practice of fishing, both for sport and for sustenance, spans across not only generations but also different cultures across the world. Different environmental conditions, including inclement weather, climate, temperature, and more, affect the presence or absence of specific fish. Further, the type of fish available often depends on not only geographical location but also topology and water source. Different fishing methods are optimal for different situations corresponding to each of the listed factors and more. A smart, prepared fisher has a diverse tackle box and knowledge of baiting methods to compliment knowledge of the behavioral patterns of the target fish. Among the various baiting methods that are particularly useful for live baiting is the method of bridle-rigging. This baiting method generally has the fisher threading a needle and twine through the bait fish, particularly through the eyes of the bait fish, then subsequently tying or securing a hook to the threaded twine between and above the bait fish's body or eyes. Such an arrangement results in the hook dangling atop the fish, thus allowing target fish to observe the bait fish and placing the hook in an appropriate position.

However, therein lies several issues. A fishing hook secured by twine has a tendency to pivot in position, resulting in the hook swaying or even falling flush against the bait fish. Such an arrangement is not ideal, as it can even prevent the target fish from biting the hook and becoming captured. The process of bridle-rigging is time consuming and complicated for new hobbyists learning the sport. While tools exist to assist in bridling, most of these fasteners, or the portion of fishing line used to bridle the live bait, cannot be reused, which complicates the process if the user fails to bridle the live bait fish properly the first time. Furthermore, none of the fasteners used to bridle live bait provide a sharp portion to allow the user to puncture through the body of the live bait. What is needed is a fastener for bridling live bait which provides a sharp portion to puncture the body of the live bait and a portion to secure the live bait to a hook or similar device in an easy and quick manner. Further desirable is a device that prevents wobbling movement of an attached fishing hook.

The present invention addresses these issues. The present invention utilizes a needle with a receiver attached to a zip tie body. A receiver has a hole through which the user can thread the needle. Once the user pierces through the bait fish, the needle threads through the receiver. The user then shifts the zip tie body into a secondary receiver. When the user pulls upon the needle, the zip tie body locks into position relative to the receiver. Before fully-tightening, the user can pierce a hook through the hook film to secure it in place. Alternatively, the user can slide the curve of the hook under the zip tie body or the receiver to achieve a similar effect. Such an arrangement keeps the hook in position for the duration of its bridle-rigged connection against both tugging and underwater turbulence.

DETAILED DESCRIPTION OF THE INVENTION

All illustrations of the drawings are for the purpose of describing selected versions of the present invention and are not intended to limit the scope of the present invention.

Figure 1:
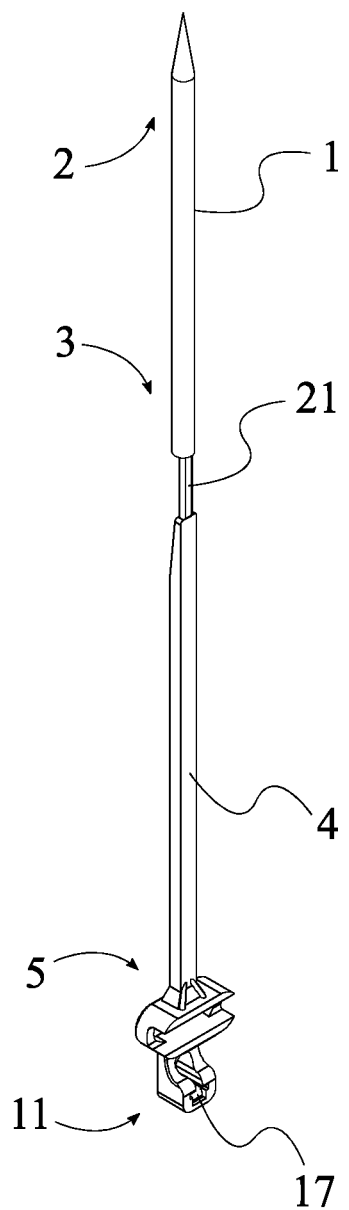
FIG. 1 is a front-left perspective view of the present invention.

The present invention is a live bait zip tie that is used to bridle-rig a hook to a bait fish. The present invention is configured to hold the hook in position, so that the hook cannot rotate or swivel out of position. The present invention comprises a prong 1, a ratchet band 4, a hook-bracing fixture 5, a band-receiving head 11, and a pawl 17, as seen in FIG. 1. The prong 1 is a generally rigid cylindrical shaft that allows the user to puncture through a bait fish. The ratchet band 4 is a generally flat segment that engages with the pawl 17 to secure the tightness of the present invention against a bait fish. The hook-bracing fixture 5 is a set of components that allows a hook to secure against the body of a bait fish. The band-receiving head 11 is a series of spaces that allow for connection of the prong 1 and ratchet band 4. The pawl 17 is a unidirectionally biased protrusion that allows for tightening engagement with the ratchet band 4.

Figure 2:
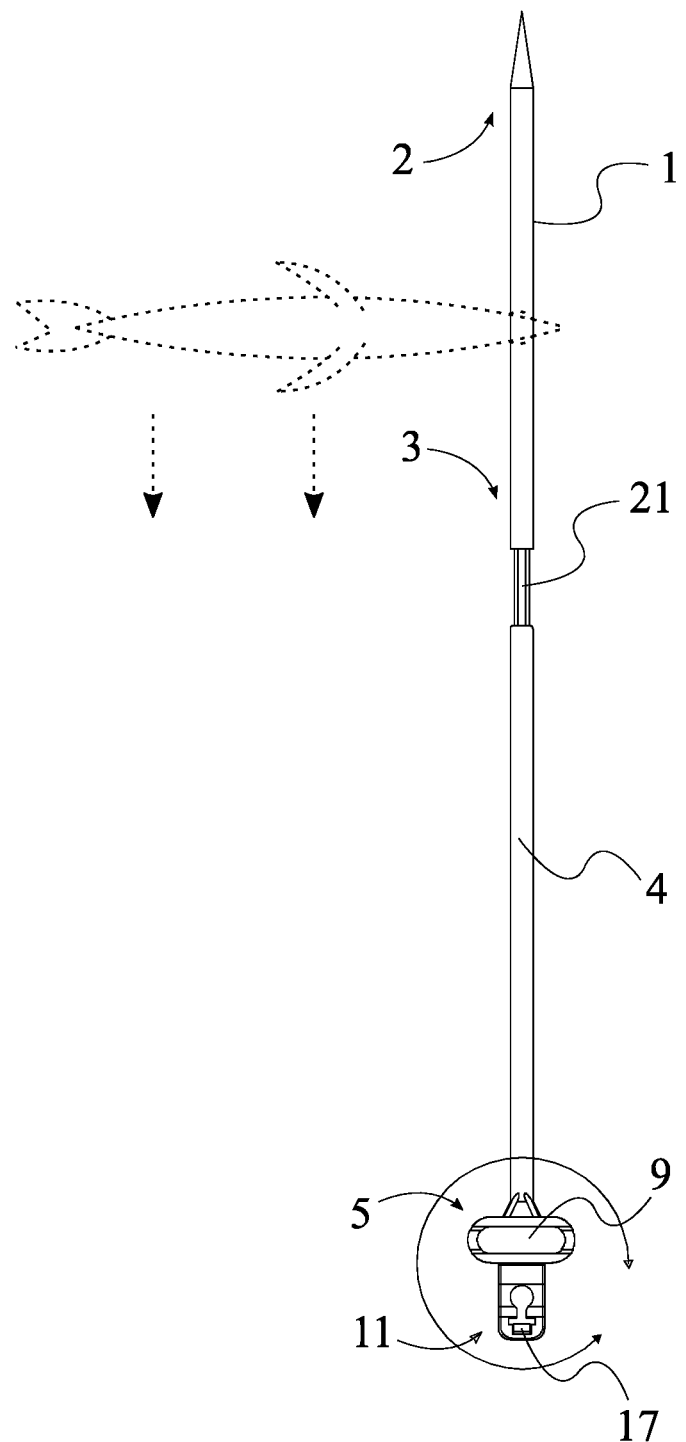
FIG. 2 is a front view of the present invention.

The general configuration of the aforementioned components allows the present invention to efficiently and effectively bridle-rig a hook to a bait fish so that the hook does not move during activity. The prong 1 comprises a pointed end 2 and a blunt end 3, as seen in FIG. 2. The pointed end 2 is a conical tip that enables piercing of a bait fish. The blunt end 3 is a segment of the prong 1 that allows for connection to the ratchet band 4. Thus, the blunt end 3 is terminally connected to the ratchet band 4. This arrangement allows for the creation of an elongated body that includes both the prong 1 and the ratchet band 4. The hook-bracing fixture 5 is terminally mounted to the ratchet band 4, opposite to the blunt end 3. In this way, the hook-bracing fixture 5 is positioned appropriately to receive a hook upon tightening of the ratchet band 4. The band-receiving head 11 is mounted adjacent to the hook-bracing fixture 5, opposite to the ratchet band 4. This arrangement allows for appropriate positioning of the band-receiving head 11 in the tightened configuration. Preferably, the ratchet band 4 is longer in length than the prong 1. This arrangement allows the pointed end 2 to fit into the band-receiving head 11. The pawl 17 is operatively integrated into the band-receiving head 11, wherein the pawl 17 is used to lock the ratchet band 4 in place by allowing the ratchet band 4 to travel one-way through the band-receiving head 11. In this way, the ratchet band 4 can engage with the pawl 17 to tighten the loop formed by the ratchet band 4 when the ratchet band 4 is positioned within the band-receiving head 11.

Figure 3:
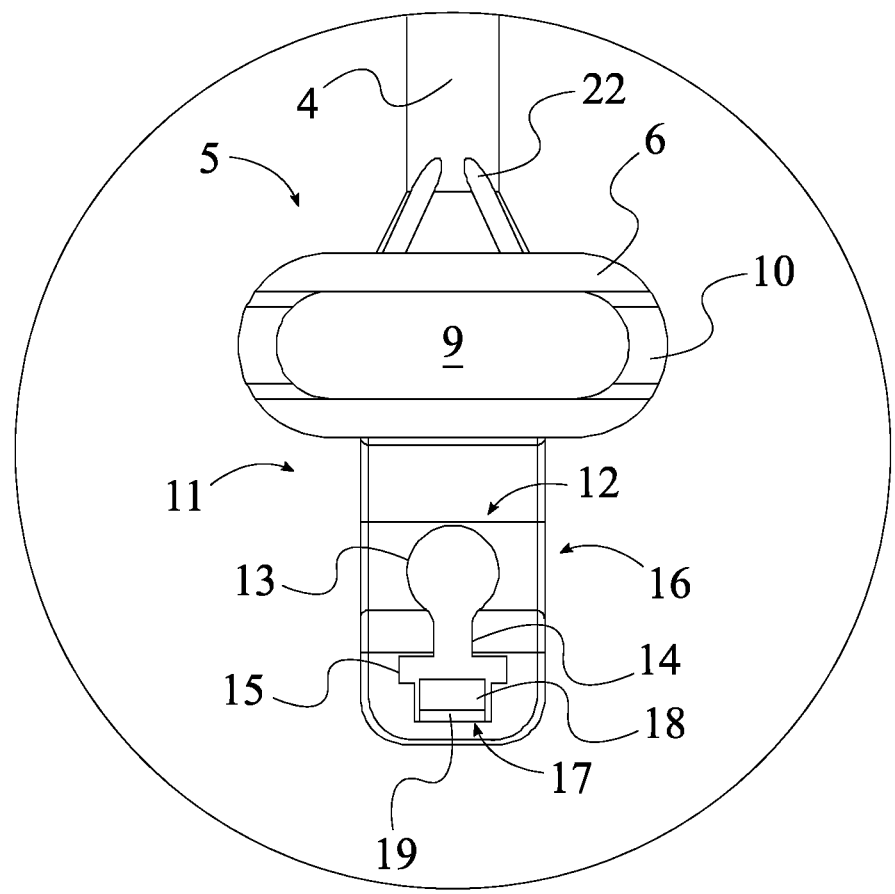
FIG. 3 is a detailed view taken about circle A in FIG. 2.

The band-receiving head 11 must be adapted to accept both the prong 1 and the ratchet band 4. To this end, the band-receiving head 11 comprises a functional hole 12 and a head body 16. The functional hole 12 is a cut into the band-receiving head 11 that allows the prong 1 and the ratchet band 4 to thread through the band-receiving head 11. The head body 16 is the physical volume occupied by the band-receiving head 11. The pawl 17 comprises a fixed end 19 and a free end 18. The fixed end 19 is a segment of the pawl 17 which mounts to the band-receiving head 11. The free end 18 is the section that interacts with the ratchet band 4. The functional hole 12 comprises a prong-receiving section 13, a slide-through section 14, and a band-receiving section 15, as seen in FIG. 3. The prong-receiving section 13 is the part of the functional hole 12 adapted to receive the prong 1. The slide-through section 14 is the part of the functional hole 12 adapted to allow the ratchet band 4 to shift into position against the free end 18. The band-receiving section 15 is the part of the functional hole 12 adapted to receive the ratchet band 4. The functional hole 12 traverses thorough the head body 16. This arrangement allows the prong 1 and the ratchet band 4 to move through the head body 16. The slide-through section 14 is positioned in between the prong-receiving section 13 and the band-receiving section 15. In this way, the ratchet band 4 is able to slide from the prong-receiving section 13 to the band-receiving section 15. The fixed end 19 is mounted onto the head body 16. Simultaneously, the free end 18 traverses into the band-receiving section 15. This arrangement allows the pawl 17 to engage with the ratchet band 4, thus allowing the ratchet band 4 to lock into incrementally tighter positions as the ratchet band 4 slides through the band-receiving section 15.

In order to engage the prong 1 correctly, the prong-receiving section 13 must be positioned so that the ratchet band 4 can bend adequately to align the prong 1 with the prong-receiving section 13. To this end, the prong-receiving section 13 is positioned in between the band-receiving section 15 and the hook-bracing fixture 5, as seen in FIG. 3. This arrangement shortens the distance between the pointed end 2 and the prong-receiving section 13, thus allowing for easier engagement of the pointed end 2 with the prong-receiving section 13.

Figure 4:
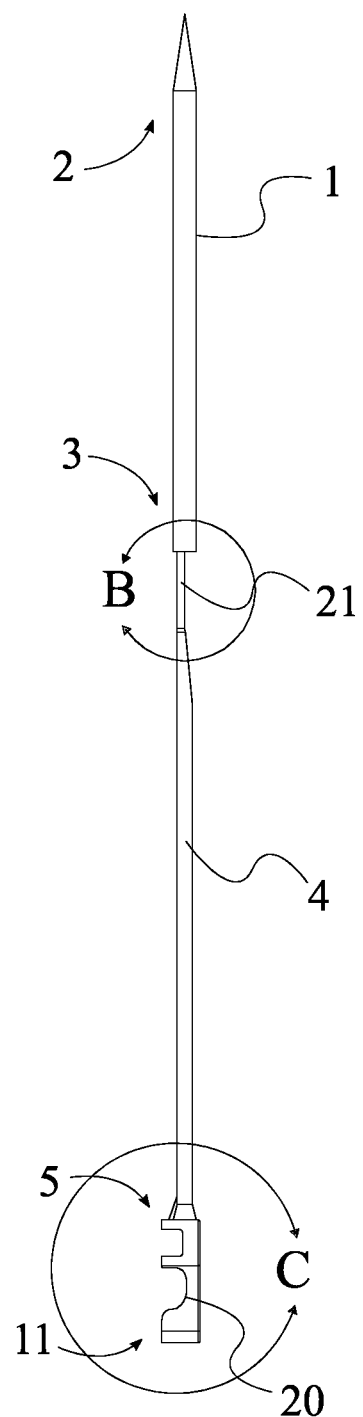
FIG. 4 is a right view of the present invention.
Figure 6:
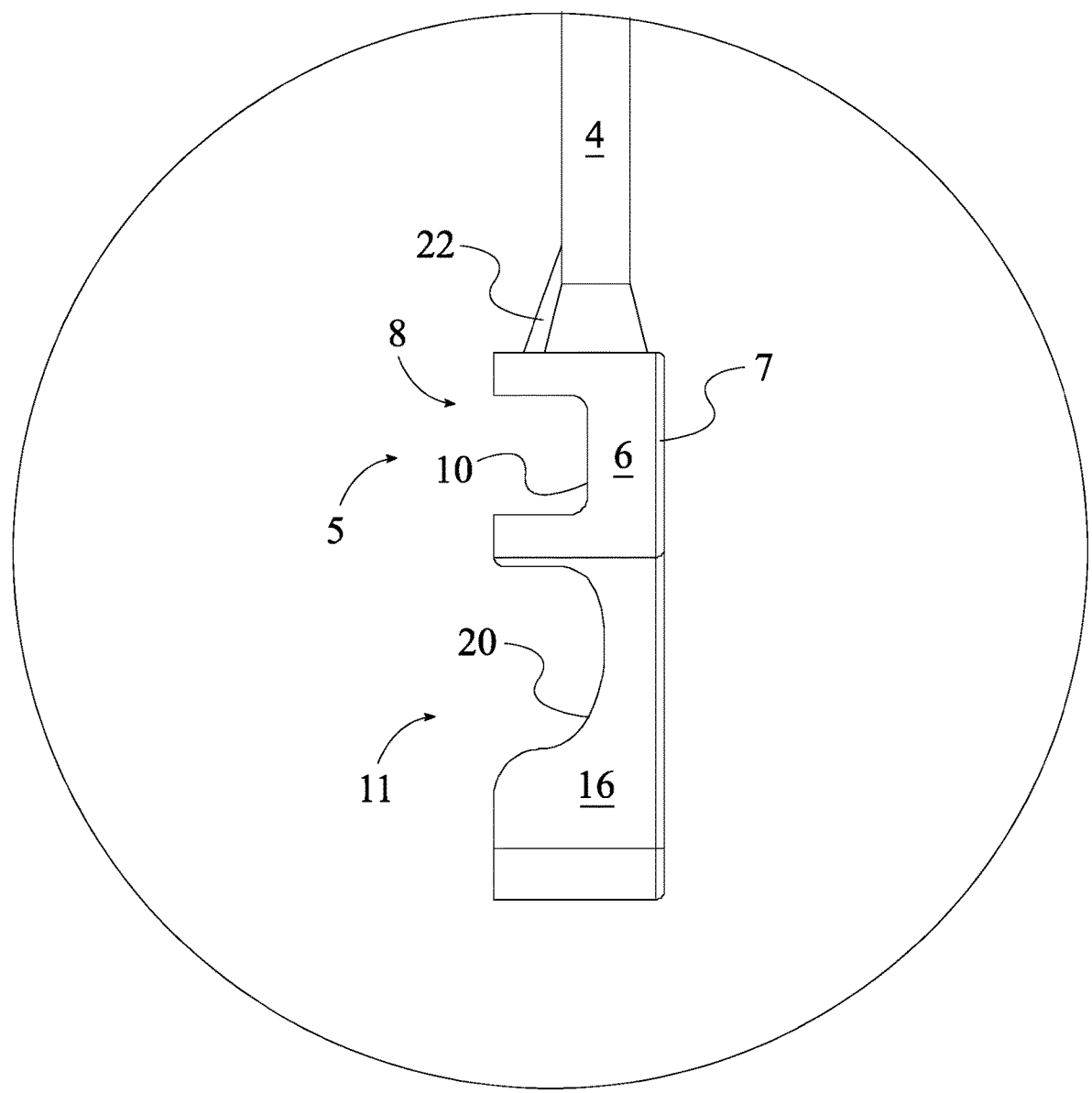
FIG. 6 is a detailed view taken about circle C in FIG. 4.

The user of the present invention may desire to attach larger fishing hooks, or two fishing hooks at once, while achieving the same ends. In order to address this issue, the present invention comprises a first hook-bracing indent 20, as seen in FIGS. 4 and 6. The first hook-bracing indent 20 is a unit that allows for lateral engagement of a fishing hook. The first hook-bracing indent 20 traverses into the head body 16. This arrangement allows the head body 16 to better support another hook. The first hook-bracing indent 20 is positioned adjacent to the hook-bracing fixture 5. In this way, a fishing hook contained by the first hook-bracing indent 20 is positioned proximally to another fishing hook, or otherwise similarly positioned for similar fishing hook usage while fishing. In an exemplary embodiment, the first hook-bracing indent 20 and the prong-receiving section 13 intersect each other. This arrangement ensures that the fishing hook contained by the first hook-bracing indent 20 is positioned and oriented similarly to a hook that is connected through the hook-bracing fixture 5.

The hook-bracing fixture 5 must be equipped to contain a hook for use while fishing. To this end, the hook-bracing fixture 5 comprises a tubular body 6 and a puncturable film 9, as seen in FIG. 3. The tubular body 6 is a semirigid extrusion that allows for positioning of the puncturable film 9 and simultaneously provides a lateral pressure which helps to keep a fishing hook in place while fishing. The puncturable film 9 is a thin layer of preferably polymeric material that provides a mechanism for retaining a fishing hook. The tubular body 6 comprises a first open end 7 and a second open end 8. The first open end 7 is the segment of the tubular body 6 through which the fishing hook travels to exit the tubular body 6. The second open end 8 is the segment of the tubular body 6 through which the fishing hook travels to puncture the puncturable film 9. The first open end 7 and the second open end 8 are positioned opposite to each other along the tubular body 6. This arrangement allows a fishing hook to enter through the second open end 8 and subsequently exit through the first open end 7. The puncturable film 9 is connected across the first open end 7. In this way, the puncturable film 9 is positioned to receive a fishing hook that passes through the tubular body 6.

The fishing hook may require additional support to maintain its positioning against currents and various fishing pressures. To this end, the hook-bracing fixture 5 further comprises a second hook-bracing indent 10, as seen in FIGS. 4 and 6. The second hook-bracing indent 10 is a cut that allows for support of a fishing hook mounted within the hook-bracing fixture 5. This arrangement allows the user to separate the ratchet band 4 from the band-receiving head 11 for reuse of the present invention. Further, the second hook-bracing indent 10 allows for engagement of larger hooks to a live bait fish using the present invention. The second hook-bracing indent 10 traverses into the tubular body 6 from the second open end 8. In this way, the second hook-bracing indent 10 is positioned to better anchor a fishing hook in position during various fishing activities. An attached fishing hook that punctures through the puncturable film 9 is then retained by the tubular body 6, the puncturable film 9, and the second hook-bracing indent 10.

Figure 5:
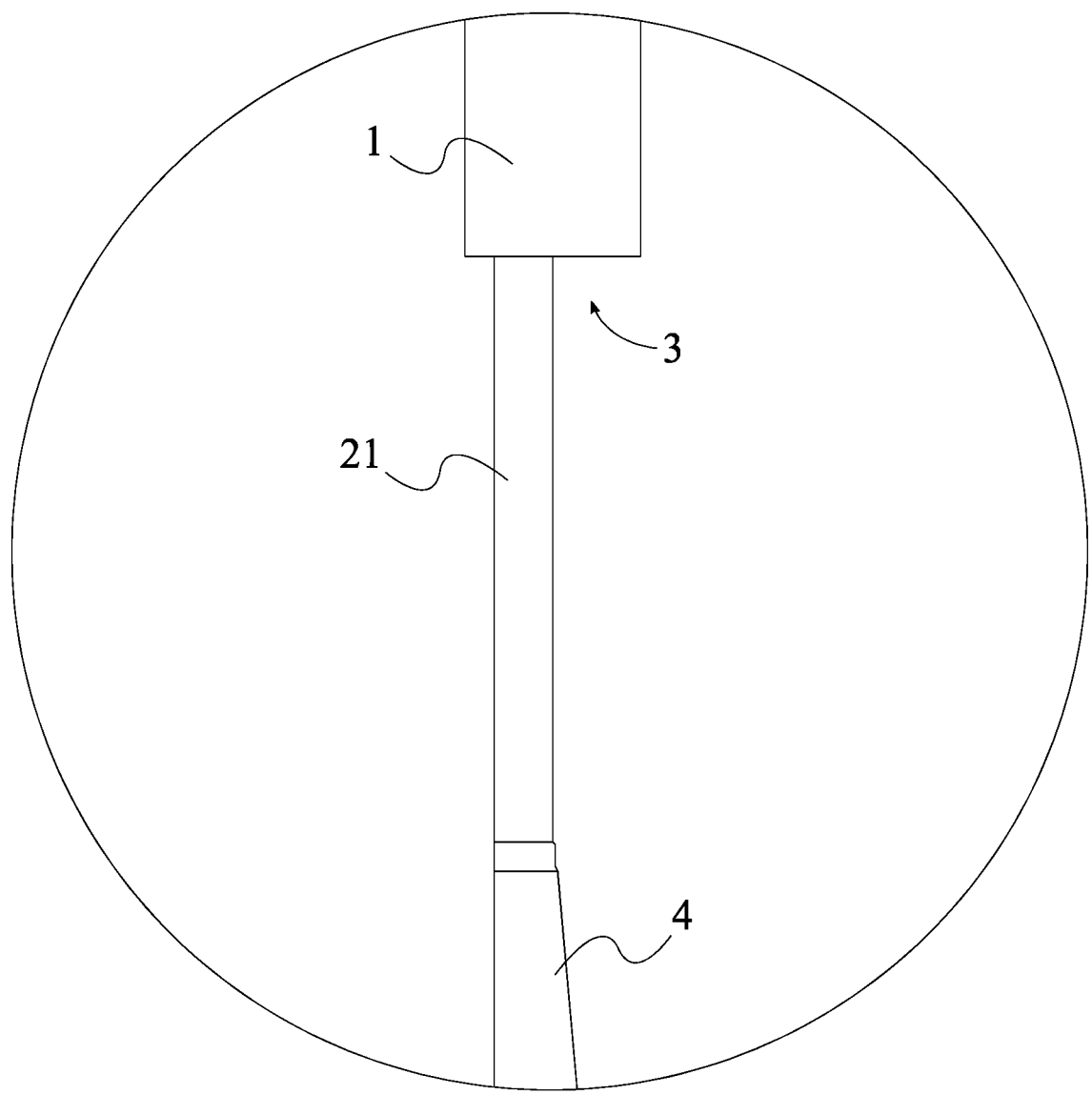
FIG. 5 is a detailed view taken about circle B in FIG. 4.

When shifting the prong 1 and the ratchet band 4 from the prong-receiving section 13 to the band-receiving section 15, the prong 1 and the ratchet band 4 must pass through the slide-through section 14. To this end, the present invention comprises a transition rod 21. The transition rod 21 is a flexible cylindrical connector that allows the user to slide the ratchet band 4 into or out of position relative to the band-receiving section 15. The blunt end 3 is terminally connected to the transition rod 21, as seen in FIG. 5. Similarly, the ratchet band 4 is terminally connected to the transition rod 21, opposite to the blunt end 3. In this way, the transition rod 21 is positioned appropriately between the prong 1 and the ratchet band 4. The transition rod 21 and the hook-bracing fixture 5 are positioned opposite to each other along the ratchet band 4. This arrangement results in an increased distance between the blunt end 3 and the hook-bracing fixture 5, thereby improving the ease of threading the prong 1 into the prong-receiving section 13.

Reusability of the present invention is limited by the mechanical stability and fatigue resistance of the present invention. To this end, the present invention comprises at least one counterfort 22. The at least one counterfort 22 is a ridge or series of ridges that improves the structural integrity of the ratchet band 4, thus preventing catastrophic failure of the ratchet band 4 due to excessive loads. The at least one counterfort 22 is connected in between the ratchet band 4 and the hook-bracing fixture 5, as seen in FIG. 6. This arrangement results in the at least one counterfort 22 being positioned at the segment of the ratchet band 4 that receives the most wear during use.

In order to utilize the present invention, the user acquires a live bait zip tie. The user threads the prong 1 into one eye of a bait fish and out the other eye. The user then pulls the present invention by the prong 1 until the ratchet band 4 is exposed. The user then threads the prong 1 into the prong-receiving section 13. The prong 1 is pulled until the prong 1 is all the way through the head body 16. The prong 1 is then pulled to the side to slide the transition rod 21 through the slide-through hole, resulting in appropriate positioning of the ratchet band 4. The ratchet band 4 is then pulled through the band-receiving hole. The ratchet band 4 engages with the pawl 17, thus preventing the ratchet band 4 from slipping back out of position. The user then grasps a fishing hook. The user pushes the point of the fishing hook into the second open end 8 and out the first open end 7 through the puncturable film 9. The user then completes tightening of the ratchet band 4 by pulling on the ratchet band 4. This process results in the positioning of a fishing hook upon the top of a bait fish's head in such a way that the fishing hook cannot move during use.

Although the invention has been explained in relation to its preferred embodiment, it is to be understood that many other possible modifications and variations can be made without departing from the spirit and scope of the invention as hereinafter claimed.

What is claimed is:

1. A live bait zip tie comprises:
a prong;
a ratchet band;
a hook-bracing fixture;
a band-receiving head;
a pawl;
the prong comprises a pointed end and a blunt end;
the blunt end being terminally connected to the ratchet band;
the hook-bracing fixture being terminally mounted to the ratchet band, opposite to the blunt end;
the band-receiving head being mounted adjacent to the hook-bracing fixture, opposite to the ratchet band;
the pawl being operatively integrated into the band-receiving head, wherein the pawl is used to lock the ratchet band in place by allowing the ratchet band to travel one-way through the band-receiving head;
the hook-bracing fixture comprises a tubular body and a puncturable film;
the tubular body comprises a first open end and a second open end;
the first open end and the second open end being positioned opposite to each other along the tubular body; and
the puncturable film being connected across the first open end.

2. The live bait zip tie as claimed in claim 1 comprises:
the band-receiving head comprises a functional hole and a head body;
the pawl comprises a free end and a fixed end;
the functional hole comprises a prong-receiving section, a slide-through section, and a band-receiving section;
the functional hole traversing through the head body;
the slide-through section being positioned in between the prong-receiving section and the band-receiving section;
the fixed end being mounted onto the head body; and
the free end traversing into the band-receiving section.

3. The live bait zip tie as claimed in claim 2 comprises:
the prong-receiving section being positioned in between the band-receiving section and the hook-bracing fixture.

4. The live bait zip tie as claimed in claim 2 comprises:
a first hook-bracing indent;
the first hook-bracing indent traversing into the head body; and
the first hook-bracing indent being positioned adjacent to the hook-bracing fixture.

5. The live bait zip tie as claimed in claim 4 comprises:
the first hook-bracing indent and the prong-receiving section intersecting each other.

6. The live bait zip tie as claimed in claim 1 comprises:
the hook-bracing fixture further comprises a second hook-bracing indent; and
the second hook-bracing indent traversing into the tubular body from the second open end.

7. The live bait zip tie as claimed in claim 1 comprises:
a transition rod;
the blunt end being terminally connected to the transition rod;
the ratchet band being terminally connected to the transition rod, opposite to the blunt end; and
the transition rod and the hook-bracing fixture being positioned opposite to each other along the ratchet band.

8. The live bait zip tie as claimed in claim 1 comprises:
at least one counterfort; and
the at least one counterfort being connected in between the ratchet band and the hook-bracing fixture.

9. A live bait zip tie comprises:
a prong;
a ratchet band;
a hook-bracing fixture;
a band-receiving head;
a pawl;
the prong comprises a pointed end and a blunt end;
the band-receiving head comprises a functional hole and a head body;
the pawl comprises a free end and a fixed end;
the functional hole comprises a prong-receiving section, a slide-through section, and a band-receiving section;
the blunt end being terminally connected to the ratchet band;
the hook-bracing fixture being terminally mounted to the ratchet band, opposite to the blunt end;
the band-receiving head being mounted adjacent to the hook-bracing fixture, opposite to the ratchet band;
the pawl being operatively integrated into the band-receiving head, wherein the pawl is used to lock the ratchet band in place by allowing the ratchet band to travel one-way through the band-receiving head;
the functional hole traversing through the head body;
the slide-through section being positioned in between the prong-receiving section and the band-receiving section;
the fixed end being mounted onto the head body; and
the free end traversing into the band-receiving section;
the hook-bracing fixture comprises a tubular body and a puncturable film;
the tubular body comprises a first open end and a second open end;
the first open end and the second open end being positioned opposite to each other along the tubular body; and
the puncturable film being connected across the first open end.

10. The live bait zip tie as claimed in claim 9 comprises:
the prong-receiving section being positioned in between the band-receiving section and the hook-bracing fixture.

11. The live bait zip tie as claimed in claim 9 comprises:
a first hook-bracing indent;
the first hook-bracing indent traversing into the head body; and the first hook-bracing indent being positioned adjacent to the hook-bracing fixture.

12. The live bait zip tie as claimed in claim 11 comprises:
the first hook-bracing indent and the prong-receiving section intersecting each other.

13. The live bait zip tie as claimed in claim 9 comprises:
the hook-bracing fixture further comprises a second hook-bracing indent; and
the second hook-bracing indent traversing into the tubular body from the second open end.

14. The live bait zip tie as claimed in claim 9 comprises:
a transition rod;
the blunt end being terminally connected to the transition rod;
the ratchet band being terminally connected to the transition rod, opposite to the blunt end; and
the transition rod and the hook-bracing fixture being positioned opposite to each other along the ratchet band.

15. The live bait zip tie as claimed in claim 9 comprises:
at least one counterfort; and
the at least one counterfort being connected in between the ratchet band and the hook-bracing fixture.

* * * * *